No. 815,968. PATENTED MAR. 27, 1906.
A. C. LYNCH.
SEPARABLE PIPE JOINT.
APPLICATION FILED SEPT. 17, 1904.
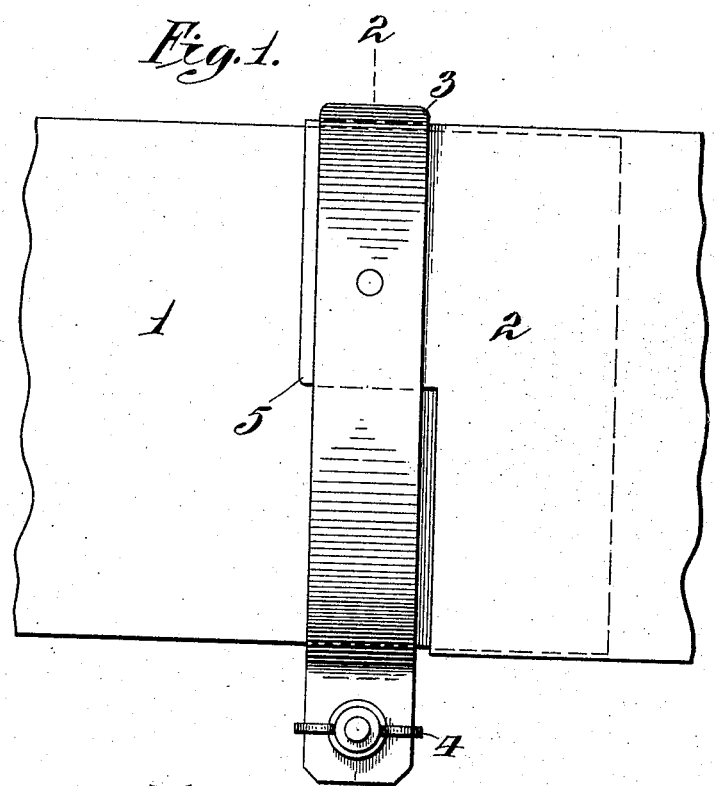
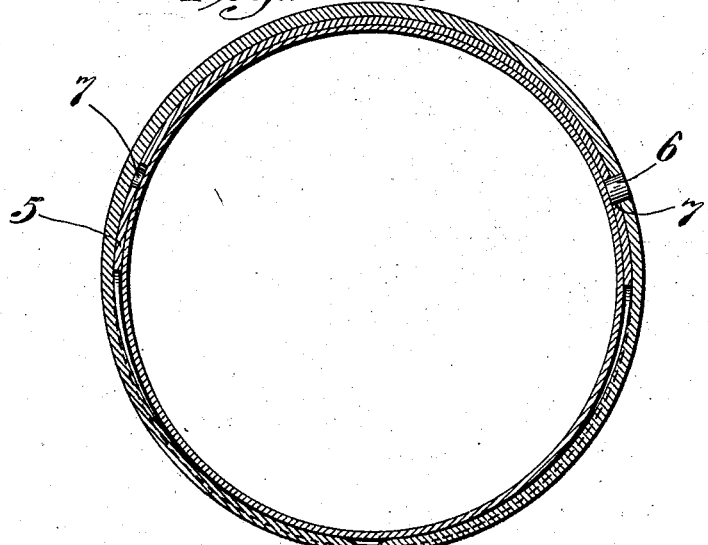

UNITED STATES PATENT OFFICE.

ARTHUR C. LYNCH, OF RICHMOND HILL, NEW YORK, ASSIGNOR TO STERLING BLOWER & PIPE MANUFACTURING COMPANY, OF HARTFORD, CONNECTICUT, A CORPORATION OF CONNECTICUT.

SEPARABLE PIPE-JOINT.

No. 815,968.　　　　Specification of Letters Patent.　　　Patented March 27, 1906.

Application filed September 17, 1904. Serial No. 224,794.

*To all whom it may concern:*

Be it known that I, ARTHUR C. LYNCH, a citizen of the United States, residing at Richmond Hill, county of Queens, State of New York, (whose post-office address is the same,) have invented certain new and useful Improvements in Separable Pipe - Joints, of which the following is a full, true, and concise specification.

This invention relates to the construction of separable joints for pipes and tubes, which are cheap of manufacture, efficient in action, and convenient of manipulation, as will presently be made to appear more fully, and the invention also involves other features hereinafter pointed out in the appended claims.

Referring to the drawings, Figure 1 represents a side elevation of a pipe-joint embodying this invention, and Fig. 2 is a transverse section of the same on the line 2 2 of Fig. 1.

The joint is formed of the two ends of pipe-section, such as 1 and 2, which telescope one within the other, as shown, and the overlapped portions of the two sections are embraced by a binding-strap 3, the function of which is to bind the female member of the joint closely against the other member. The strap may be of various constructions so long as it serves the above purpose, and in the drawings it is shown as a flat strip of metal with outturned perforated ends provided with a bolt and thumb-nut 4, whereby the same may be easily drawn together. The female member is cut away or recessed at its end where it overlaps the male member in such manner that the remaining internal projecting end 5, which may be of any width desired, but of less length than the length of the overlapped portion, will bind forcibly upon the male member under the constricting influence of the tightened strap, and the recess may be made of sufficient circumferential dimension to permit the strap to bear through it directly against the inner male member, thereby producing a construction especially secure in that the tendency of the two sections to separate will skew the strap and increase its binding action. Preferably the recess extends substantially half-way around the end of the female member, as shown in the drawings, and the strap is suitably attached to the projection 5, although it may be secured to the male member, if so desired. The attachment of the pipe to the strap may be according to any approved method, provided that such connection will be secure when the strap is tightened. I have preferred a method by which the strap may be easily reversed in position with respect to the joint—that is to say, one in which the thumb-nut may be readily disposed upon either side of the joint without necessitating the removal of its bolt. This attachment consists in providing the strap with a projecting pin 6, adapted to engage with one or the other of the two apertures 7 on opposite sides of the projection 5, according to whichever side the thumb-nut is desired to be located; but it would be obvious that a single central aperture would be sufficient to effect the same result and also that the relative positions of pin and recess might be reversed—*i. e.*, the pin might be placed upon the pipe and the aperture in the strap, if desired.

With the above construction two pipe-sections may be quickly brought together in telescoping relation, the strap having been previously placed over one of them in such position as to bring the thumb-nut on the desired and most convenient side. Upon tightening the strap by screwing the thumb-nut the parts will be brought together into secure locked condition; but they may be easily disassembled upon loosening the thumb-nut.

Having described my invention, what I claim, and desire to secure by United States Letters Patent, is—

1. A pipe-joint comprising male and female members, a recess formed in the end of the female member to leave an integral projection overlapping the male member, and a binding-strap embracing said projection and male member.

2. A pipe-joint comprising male and female members, a recess formed in the end of the female member to leave an integral projection thereon overlapping the male member, a binding-strap attached to said projection embracing the male member and means for tightening the said strap.

3. A pipe-joint comprising male and female members, a projection on said female member formed by recessing the end of the same and a binding-strap embracing said projection and the male member and unconnected with said female member on the side of the joint opposite to said projection, whereby said strap will skew under the tendency of the members to separate.

4. A pipe-joint comprising male and female members, a projection formed substantially half-way around the end of said female member and a binding-strap reversibly attached to said projection, said attachment consisting of an aperture in one part and a pin on the other engaging the same.

In testimony whereof I have signed my name to the specification in the presence of two subscribing witnesses.

ARTHUR C. LYNCH.

Witnesses:
G. A. TAYLOR,
H. G. KIMBALL.